United States Patent
Benitsch

(10) Patent No.: US 7,186,360 B2
(45) Date of Patent: Mar. 6, 2007

(54) METHOD OF MAKING CERAMIC COMPOSITE DEVICES WITH UNIDIRECTIONALLY ALIGNED REINFORCING FIBERS

(75) Inventor: Bodo Benitsch, Buttenwiesen (DE)

(73) Assignee: SGL Carbon AG, Wiesbaden (DE)

( * ) Notice: Subject to any disclaimer, the term of this patent is extended or adjusted under 35 U.S.C. 154(b) by 570 days.

(21) Appl. No.: 10/376,905

(22) Filed: Feb. 28, 2003

(65) Prior Publication Data
US 2007/0007678 A1 Jan. 11, 2007

(30) Foreign Application Priority Data
Feb. 28, 2002 (DE) ............... 102 08 991

(51) Int. Cl.
*B28B 1/48* (2006.01)
*C04B 35/00* (2006.01)
(52) U.S. Cl. ............ 264/44; 264/656; 264/658; 264/682; 264/136
(58) Field of Classification Search ............... 264/29.1, 264/29.2, 44, 45.3, 656, 658, 682, 136
See application file for complete search history.

(56) References Cited

U.S. PATENT DOCUMENTS

| 6,030,913 A | 2/2000 | Heine et al. | |
|---|---|---|---|
| 6,231,791 B1 | 5/2001 | Heine et al. | |
| 6,355,206 B1 * | 3/2002 | Hanzawa et al. | 266/239 |
| 6,472,058 B2 * | 10/2002 | Hanzawa et al. | 428/293.4 |
| 6,521,344 B1 * | 2/2003 | Hanzawa | 428/408 |
| 2002/0006506 A1 * | 1/2002 | Hanzawa et al. | 428/293.1 |

FOREIGN PATENT DOCUMENTS

| DE | 197 10 105 A1 | 9/1998 |
|---|---|---|
| DE | 198 05 608 C2 | 8/1999 |
| DE | 198 15 308 A1 | 10/1999 |
| DE | 199 44 345 A1 | 3/2001 |
| EP | 0 202 145 A1 | 11/1986 |
| EP | 0 926 111 A2 | 6/1999 |
| EP | 1 028 098 A2 | 8/2000 |
| EP | 1 028 099 A2 | 8/2000 |

* cited by examiner

*Primary Examiner*—Steven P. Griffin
*Assistant Examiner*—Carlos Lopez
(74) *Attorney, Agent, or Firm*—Laurence A Greenberg; Werner H. Stemer; Ralph E. Locher

(57) ABSTRACT

Ceramic composite materials have unidirectional alignment of the reinforcing fibers. The ratio of the volume of the fiber strands of the reinforcing fibers to the volume of the matrix is at least 0.5. A process for their production involves initially coating the fiber strands or rovings of the reinforcing fibers with a sacrificial polymer. The coated fiber strands are processed with binder resins into unidirectionally reinforced CFK molded parts. The formed CFK bodies are carbonized to form CFC bodies. The CFC bodies are then silicized with liquid silicon. The liquid silicon diffuses into the pores formed in the CFC body and combines there at least partially with the carbon to form silicon carbide. The sacrificial polymer is pyrolized. The ceramic composite materials also can be used in fiber-reinforced ceramic structural parts.

22 Claims, 1 Drawing Sheet

2    1

1    3    2

METHOD OF MAKING CERAMIC COMPOSITE DEVICES WITH UNIDIRECTIONALLY ALIGNED REINFORCING FIBERS

BACKGROUND OF THE INVENTION

Field of the Invention

The invention relates to ceramic composite materials with unidirectional alignment of the reinforcing fibers, ceramic composite devices, and processes for their production and production of structural parts.

Structural parts formed from fiber-composite materials in which the fiber alignment largely coincides with the principal stress direction of the structural part have been known for a long time. For structural parts that are subjected to high thermal stresses, composite materials formed from carbon fiber-reinforced carbon have proved particularly successful (termed C/C, CFC, or CFRC). Because of the oxidation sensitivity of the C/C materials at high air temperatures, this class of materials however is excluded from numerous technically important areas of application. A significant improvement as regards this adverse property was achieved by the introduction of ceramic composite materials reinforced with carbon fibers, whose matrix contains silicon carbide. Such materials include the C/SiC (the matrix is silicon carbide) or C/C—SiC materials (the matrix contains carbon and silicon carbide, as well as optionally silicon). Apart from pure carbon fibers, other reinforcing fibers, e.g. based on carbon (e.g. fibers of carbides such as SiC) may also be used.

Typical processes for the production of C/SiC structural parts reinforced with short fiber reinforcement are known for example from commonly-owned, German Published, Non-Prosecuted Patent Application DE 197 10 105 A1, which corresponds to U.S. Pat. No. 6,231,791 B1 and U.S. Pat. No. 6,030,913 A. The process includes, inter alia, the following steps:
- production of a compressible and hardenable mixture that contains C fibers or fiber bundles as well as binders such as for example phenol resins and optionally fillers;
- shaping of the mixture and hardening it to form a green compact of CFK (plastics material reinforced with carbon fibers), generally under pressure and elevated temperature;
- carbonization of the carbon-containing fillers and binders to produce a C/C molded part; and
- infiltration of the molded part with a silicon melt and at least partial reaction of the carbon in the molded part to form SiC.

The short fibers used in these processes, which are up to ca. 30 mm long, are ideally aligned isotropically so that the tensile strength of the C/SiC structural part is substantially identical in all spatial directions. If load states that are limited to one or a few discrete spatial directions are present in a fiber composite structural part on account of the geometry and loading of the latter, then the fibers should preferably be aligned parallel to these principal loading directions in order to be able to utilize the maximum reinforcing effect of the fibers. To this end, long or endless fibers are normally used for fiber-reinforced ceramic composite materials, which fibers then preferably or completely lie in the direction of the stress tensors. In this connection those fibers are termed long fibers whose length is at least 50 mm, preferably at least 75 mm and in particular at least 100 mm. Normally endless fibers (rovings) are used, whose length in the relevant application is restricted only by the dimensions of the structural parts produced therefrom. Parallel nonwovens of endless fibers or long fibers are termed "unidirectional (UD) fiber nonwovens". In the production of long fiber-reinforced C/SiC, the fabrication of green compacts from CFK is normally carried out by assembling layers of fiber mats or fiber wovens on top of one another using prepreg technology, or in the case of rotationally symmetrical structural parts, preferably by coiling technology.

For the subsequent silicization and formation of the SiC matrix, the pore structure formed in the carbonization of the CFK to the CFC body is of decisive importance, for only by a suitable pore structure can it be ensured that liquid silicon will penetrate uniformly and in a sufficient amount into the CFC body.

The carbonization of the binder resins and additives of the CFK body leads to a marked shrinkage of the matrix in the transition to the CFC state. Depending on the type of fiber reinforcement, the fibers or fiber strands (rovings) may or may not follow this movement. Thus, for example, fibrous tissues are built up from warp and weft, i.e. two overlapping thread systems (2D fiber configuration in the x and y directions). The volume shrinkage occurring during carbonization is prevented by the fibers lying in the plane (x, y plane) of the tissue, with the result that a characteristic microcrack pattern with continuous capillaries is formed.

If an isotropic three-dimensional fiber configuration exists, then the fibers or fiber strands cannot follow the contraction of the matrix in any of the spatial directions, and a continuous microcrack structure that is open to all sides is formed.

If however all the rovings of the reinforcing fibers are aligned parallel and without being fixed in the plane, then the carbonization of the binder resins leads to an unhindered contraction perpendicular to the fiber alignment, so that the rovings in the CFC shrink very tightly together and come to lie against one another with a minimum degree of open porosity. The liquid silicization is thereby rendered difficult since the pore volume and the distribution of capillaries (microchannels) in the interior of the material are changed unfavorably compared to the CFC precursors isotropically reinforced with short fibers. It has therefore not hitherto been possible using conventional techniques to achieve satisfactory properties in the case of C/SiC materials reinforced with unidirectional fibers ("UD fibers").

SUMMARY OF THE INVENTION

It is accordingly an object of the invention to provide ceramic composite materials with unidirectional alignment of the reinforcing fibers, ceramic composite devices, and processes for their production and production of structural parts that overcome the hereinafore-mentioned disadvantages of the heretofore-known devices and methods of this general type and that provide such fiber composite materials with a silicon-carbide containing matrix and that are reinforced in a unidirectional configuration with reinforcing fibers, in particular carbon fibers.

With the foregoing and other objects in view, there is provided, in accordance with the invention, a silicon-carbide containing matrix and processes for the manufacture thereof, whereby the liquid silicon can penetrate unhindered in the silicization step through microchannels or capillaries in the CFC body into the interior of the body and can react with the carbon of the matrix in the desired way to form silicon carbide. The microchannels should preferably be formed in the direction of the rovings. A suitable process has to be developed for this purpose. The method produces unidirecitonally fiber-reinforced CFK and CFC precursors that are suitable for the liquid silicization for the production of C/SiC structural parts. These parts do not exhibit the aforementioned disadvantages of the prior art.

This object is achieved if the fiber strands or rovings used for the production of the CFK bodies are coated with polymers, so-called "sacrificial polymers", that prevent the parallel aligned rovings shrinking together during the carbonization of the CFK body, and that lead to a favorable pore channel structure. "Sacrificial polymers" are hereinafter termed those polymeric substances that thermally decompose during the carbonization (heat treatment of CFK bodies in a non-oxidizing atmosphere at temperatures of ca. 750° to ca. 1100° C.), in which connection they decompose either without leaving a residue or in a substantially residue-free manner, or preferably leave a carbon residue in an amount of ca. 10 to ca. 60% of the mass of the polymer that is used. If the mass of the pyrolysis residue of a polymer, which is formed substantially of carbon, is above ca. 10% of its initial mass, then the polymer is termed a carbonizable polymer. According to the invention, it is also possible to use those polymers that thermally decompose without leaving a residue or in a substantially residue-free manner (i.e. leaving a residue of up to 10 of the polymers), i.e. that are completely or almost completely pyrolized. The polymers are preferably incorporated in the form of fibers ("sacrificial fibers") into the CFK body. Preferably, the rovings of the reinforcing fibers are in this connection coated individually by sacrificial fibers or are separated from one another by sacrificial fibers. It is particularly preferred to use a mixed yarn that contains reinforcing fibers as well as sacrificial fibers, which are necessarily aligned in the same preferential direction. In the carbonization of the CFK precursor, which preferably includes rovings coated with sacrificial fibers, and binder resin, the sacrificial fibers are thermally destroyed (pyrolized or carbonized), so that pores and microchannels having a specific geometry and alignment are thereby produced, namely those in the form of the polymers that have decomposed in the meantime, and having the same geometrical alignment as the reinforcing fibers. The pyrolysis residue or carbonization residue from the sacrificial fibers, which is formed substantially of carbon and remains in the form of porous structures at the site of the decomposed polymers (and in particular forms no additional protective layer), acts when the rovings shrink together and as a capillary-forming agent along the fiber strands or rovings. Since the polymers enclose the fiber strands of the reinforcing fibers or run in the form of fibers with the latter, the desired capillaries or microchannels are formed in the desired alignment at the site of the decomposed polymers.

With the foregoing and other objects in view, there is provided, in accordance with the invention, a process for the production of ceramic composite materials with a unidirectional alignment of the reinforcing fiber includes the following steps:
  first of all fiber strands or rovings of the reinforcing fibers are coated with a polymer or are separated from one another by the latter;
  the fiber strands or rovings treated in this way are processed with the addition of binder resins to form unidirectionally reinforced CFK molded parts;
  the formed CFK bodies are carbonized to form CFC bodies, wherein the polymer either completely or almost completely decomposes during the carbonization step with the formation of a residue in an amount of up to 10% of the mass of the polymer used in the form of fibers, or decomposes with the formation of a carbon-containing residue in an amount of 10 to 60% of the mass of the polymer that is used, whereby a pore channel structure is formed and the volume ratio of the polymer to the fiber strands or rovings is 0.05 to 50, and/or the mass ratio of polymers to the fiber strands or rovings is 0.1 to 25; and
  the formed CFC bodies are then infiltrated with liquid silicon in such a way that the liquid silicon penetrates into the pore system formed in the CFC body and there combines at least partially with the carbon to form silicon carbide.

The process according to the invention therefore envisages, in particular, first coating fiber strands or rovings of the reinforcing fibers with polymer. In principle, all customary processes for coating fiber bundles are suitable for this purpose, such as for example poltrusion. However, coating using fibers from the polymer is particularly preferred. Typically, the rovings from reinforcing fibers are bonded, coiled up, wound round with yarn, woven round, or woven with fibers from the polymer in the form of individual filaments. Particularly preferable, the rovings from reinforcing fibers are entwined or twisted with the fibers from the polymer. It is also possible to use wovens or mixed wovens from these fibers for coating the reinforcing fibers.

The pyrolysis behavior and pyrolysis residue of the polymer play a decisive role in the choice of the latter. It is particularly preferred to use those polymers that soften or decompose only above the curing temperature of the binder resins of the CFK. These are typically high melting point thermoplastic materials with softening temperatures above ca. 150° C. or thermosetting materials (also termed thermosets) with decomposition temperatures above ca. 150° C. Polyesters, polyamides, aramides, polyacrylonitrile, polyurethanes, or polyimides are preferably used as polymer. The polymers are particularly preferably used in the form of fibers, in particular polyester fibers, aramide fibers, polyacrylonitrile fibers, cellulose fibers, or wool fibers.

Carbon fibers (C fibers) are normally used as reinforcing fibers. Other conventional fiber materials for high temperature composite materials can however also be employed. Such fibers include for example silicon carbide fibers, silicon nitride fibers, boron nitride fibers, and oxidic fibers based on aluminum oxide, zirconium oxide, boron oxide, silicon dioxide, yttrium oxide, and their mixtures. If C fibers are used, then it may be advantageous to use a special fiber protection against the reactive attack during the liquid silicization, which includes reacting the liquid silicon and the carbon of the fibers with the formation of silicon carbide. Such a fiber protection may be formed for example by carbon-containing or carbide-containing coatings on the fibers.

The fiber strands or rovings encased in this way are processed in a known manner and under the addition of binder resins to form unidirectionally reinforced CFK molded parts. For example, prepreg technology or wet coiling or poltrusion or dried coiling process followed by resin impregnation are ideally suitable as production processes for the green compacts. As binder resins there are preferably used, the conventional resins known in CFK technology, in particular phenol resins, epoxide resins and furan resins. Carbonizable polymers with pyrolysis residues greater than ca. 10%, preferably with pyrolysis residues in the range from 12 to 70% and particularly preferably in the range from 15 to 55% are preferably employed as binder resins. In this connection, the ratio of the mass of the material remaining after the pyrolysis to the mass of the starting material is termed the pyrolysis residue.

According to the invention, it is preferred to limit the amount of binder resin in the production of the CFK bodies. The proportion by weight of binder resin in the CFK body is preferably 25 to 75%, particularly preferably 25 to 50% and in particular 30 to 45%.

A particular advantage of the process according to the invention is that it is possible, by controlling the nature and amount of the coating sacrificial polymer, to adjust in a simple way the matrix content of the subsequently formed C/SiC ceramic via the pyrolysis residue of the sacrificial polymer and of the binder resin and thereby to adjust the amount of carbon formed in the carbonization, wherein in particular the use of sacrificial fibers provides a simple and inexpensive production procedure.

Typically, the volume ratio of sacrificial polymer to rovings is in the range from 0.05 to 50, preferably in the range from 0.1 to 25 and particularly preferably 0.1 to 10, and/or the mass ratio of sacrificial polymer to rovings is in the range from 0.1 to 25, preferably in the range from 1 to 12 and particularly preferably 1 to 5.

The CFK bodies that are formed, which having regard to shrinkage have the shape of the desired workpiece, are then carbonized in a known way. The so-called CFC bodies (in English "CFRC") are thereby formed. The pyrolysis of the fibrous polymers also takes place in this step, the desired pore channels or capillaries being formed along the reinforcing fibers. These are then silicized with liquid silicon, also in a known manner, the liquid silicon penetrating under the action of capillary forces into the pores formed in the CFC body and combining there at least partially with the carbon to form silicon carbide.

The composite material obtained after the silicization is characterized by the fact that the ratio of the volume of the fiber strands or rovings to the volume of the matrix surrounding the fiber strands or rovings is comparatively large, typically greater than 0.5, preferably greater than 1 and particularly preferably greater than 1.3. Volume ratios in the region of 2 or above are preferred for mechanically highly stressed structural parts subjected to a low corrosive stress. Such composite materials are available for the first time via the process according to the invention.

A further advantage of the invention is that very uniform structures are formed, with only a slight variability of the expansion of fibers and matrix regions. Preferably, the mean lateral dimension (measured perpendicular to the UD fiber strand, i.e. parallel to the diameter of the fiber strands) of the fiber strands or rovings is greater than the mean lateral dimension of the adjacent matrix regions, and is preferably at least twice as large. The variability of the ratio of the expansion of the fiber regions, measured as the diameter of the fiber strands or rovings of the reinforcing fibers, to the expansion of the adjacent matrix regions, measured as described above, is in this connection preferably at most 10%, particularly preferably at most 8% and especially at most 5%.

A further aspect of the invention is the use of the unidirectionally fiber-reinforced composite materials, in particular those composite materials reinforced with carbon fibers, with a silicon carbide-containing matrix, for the production of structural parts. The so-called UD-C/SiC is normally used as reinforcing component in complexly assembled structural parts. Particularly favorable in this connection are structural parts that are built up from UD-C/SiC and further C/SiC material variants. Structural parts with a high proportion of UD-C/SiC are preferably employed for components used in assembly devices such as screws, bolts, sleeves or tubing in environments subjected to high thermal and mechanical stresses. In this case, the volumetric proportion of the UD-C/SiC is preferably above 50% of the overall structural part.

The composite materials according to the invention can be used to particular advantage in rapidly rotating structural parts, for example in friction discs for brakes or in clutch discs. In this case, the unidirectional reinforcement is particularly preferably effected tangentially to the axis of rotation, i.e. in the circumferential direction of the structural parts.

Other features that are considered as characteristic for the invention are set forth in the appended claims.

Although the invention is illustrated and described herein as embodied in ceramic composite materials with unidirectional alignment of the reinforcing fibers, ceramic composite devices, and processes for their production and production of structural parts, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
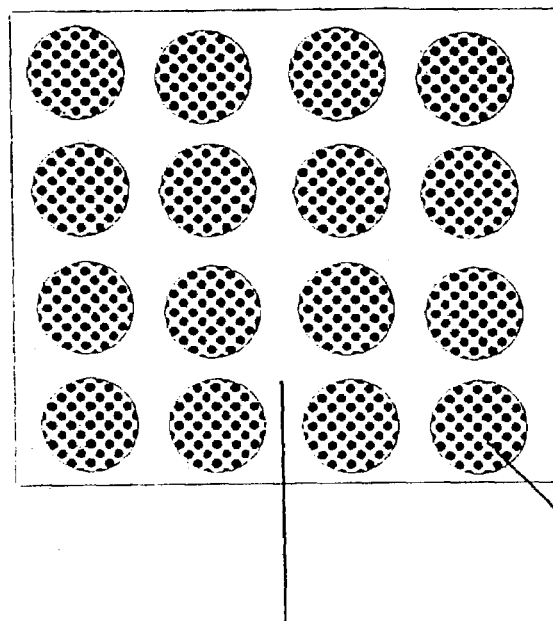
FIG. 1 is a diagrammatic sectional view through a composite material according to the invention, the sectional plane running perpendicular to the fiber direction.

Referring now to the figures of the drawings in detail and first, particularly to FIG. 1 thereof, there is shown a section through a composite material that contains a continuous matrix phase 2 and fiber bundles 1 of endless fibers or rovings. The matrix 2 contains phases of silicon carbide, silicon and possibly unreacted carbon.

It is also possible to configure the rovings coated with sacrificial polymers or surrounded by fibers, fiber yarns or filaments of fibrous sacrificial polymers, in such a way that the gussets between the fiber bundles are not completely filled with matrix in the silicization. This is achieved for example by wide capillaries or a sub-stoichiometric amount of silicon. Accordingly, the silicon passes under the action of capillary forces into the zone immediately surrounding the rovings, which contains the carbonized residues of the sacrificial polymers and possibly of the binder resin, and reacts there with the carbon to form silicon carbide, the gussets between the fiber bundles remaining unfilled.

Figure 2:
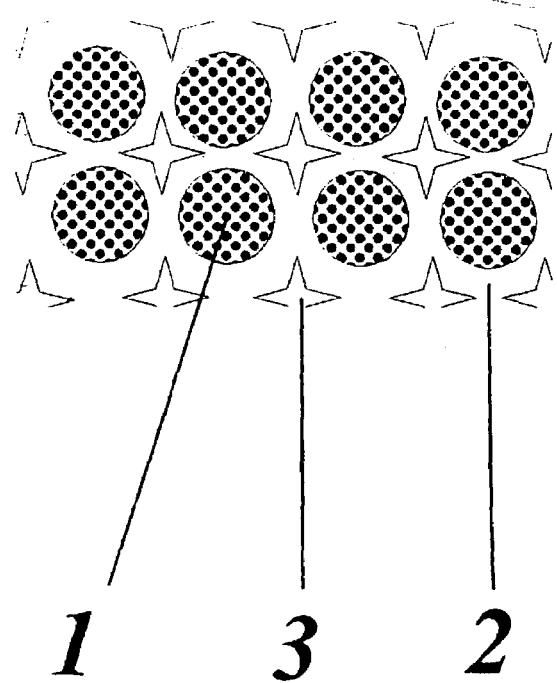
FIG. 2 is a diagrammatic sectional view through a composite material with pore channels according to the invention, the sectional plane running perpendicular to the fiber direction.

FIG. 2 shows a section through a composite material produced according to this embodiment, in which the sectional plane is again aligned perpendicular to the direction of the fibers. The rovings 1 are surrounded by a thin sheath of matrix material 2. Adjacent bundles are separated in each case by a matrix layer. Interstices 3 extend in the form of microchannels along the fiber bundles remain between the latter.

I claim:

1. A process for producing ceramic composite materials with unidirectionally aligned reinforcing fibers, which comprises:
   providing a polymer over reinforcing fibers, the polymer having a mass;
   processing the reinforcing fibers having the polymer thereover by adding binder resins to form a unidirectionally reinforced CFK molded part;
   carbonizing the unidirectionally reinforced CFK molded part to form a Carbon Fiber-reinforced Carbon (CFC) body;
   decomposing the polymer at least almost completely during the carbonizing step to form a carbon residue in an amount of up to 60% of the mass of the polymer, to form a pore channel structure, and to set at least one of a volume ratio of the polymer to the reinforcing fibers from 0.05 to 50 and a mass ratio of the polymer to the reinforcing fibers from 0.1 to 25; and
   infiltrating the CFC body with liquid silicon to penetrate the liquid silicon into the pore channel structure formed in the CFC body and to combine the liquid silicon at least partially with the carbon residue to form silicon carbide.

2. The process according to claim 1, which further comprises setting the amount of the carbon residue formed in the decomposing step to be from 10% to 60% of the mass of the polymer.

3. The process according to claim 1, which further comprises setting the amount of the carbon residue formed in the decomposing step to be up to 10 of the mass of the polymer.

4. The process according to claim 1, which further comprises using rovings as the reinforcing fibers.

5. The process according to claim 1, which further comprises using fiber strands as the reinforcing fibers.

6. The process according to claim 1, which further comprises coating the reinforcing fibers with the polymer.

7. The process according to claim 1, which further comprises separating the reinforcing fibers from each other with the polymer.

8. The process according to claim 1, which further comprises completely decomposing the polymer during the carbonizing step.

9. The process according to claim 1, which further comprises choosing, as the polymer, a thermoplastic material having a softening point above 150° C.

10. The process according to claim 1, which further comprises choosing, as the polymer, a thermoset having a decomposition temperature above 150° C.

11. The process according to claim 1, which further comprises providing the polymer in fiber form.

12. The process according to claim 11, which further comprises selecting the polymer in fiber form from the group consisting of a polyester fiber, an aramide fiber, a polyacrylonitrile fiber, a cellulose fiber, and a wool fiber.

13. The process according to claim 11, which further comprises connecting the reinforcing fibers and the polymer in fiber form by a method selected from the group consisting of entwining, bonding, coiling, threading, weaving round, sewing, interweaving, twisting, and encasing the reinforcing fibers within a woven made from the polymer in fiber form.

14. The process according to claim 1, which further comprises using carbon fibers as the reinforcing fibers.

15. A method for producing structural parts, which comprises:
   forming a structural part including unidirectionally aligned carbon reinforcing fibers and a matrix, the matrix obtained by:
   providing a polymer over the unidirectionally aligned carbon reinforcing fibers, the polymer having a mass;
   processing the unidirectionally aligned carbon reinforcing fibers having the polymer thereover by adding binder resins to form a unidirectionally reinforced CFK molded part;
   carbonizing the unidirectionally reinforced CFK molded part to form a Carbon Fiber-reinforced Carbon (CFC) body;
   decomposing the polymer at least almost completely during the carbonizing step to form a carbon residue in an amount of up to 60% of the mass of the polymer, to form a pore channel structure, and to set at least one of a volume ratio of the polymer to the carbon reinforcing fibers from 0.05 to 50 and a mass ratio of the polymer to the reinforcing fibers from 0.1 to 25;
   infiltrating the CFC body with liquid silicon to penetrate the liquid silicon into the pore channel structure formed in the CFC body and to combine the liquid silicon at least partially with the carbon residue to form silicon carbide; and
   maintaining a ratio of a volume of said reinforcing fibers to a volume of said matrix of at least 0.3.

16. The method according to claim 15, which further comprises including, in the structural part, a composite material selected from the group consisting of a reinforcing fiber, a carbon fiber formed as a short fiber, and a two-dimensional formation having a matrix containing silicon carbide and having a configuration selected from the group consisting of a woven, a knitted fabric, a felt, a fleece, and a knitting fiber.

17. The method according to claim 16, which further comprises:
   including a plurality of the composite materials; and
   combining the plurality of the composite materials with one another by joint silicization.

18. The method according to claim 15, which further comprises selecting the structural part from the group consisting of a screw, a bolt, a sleeve, and tubing.

19. The method according to claim 15, which further comprises forming a rotationally symmetrical as the structural part.

20. The method according to claim 15, which further comprises forming a coiled part as the structural part.

21. The method according to claim 20, which further comprises selecting the rotationally symmetrical part from the group consisting of a nozzle and a combustion chamber.

22. The method according to claim 15, which further comprises forming a friction disc as the structural part.

* * * * *

UNITED STATES PATENT AND TRADEMARK OFFICE
CERTIFICATE OF CORRECTION

| | | |
|---|---|---|
| PATENT NO. | : 7,186,360 B2 | Page 1 of 1 |
| APPLICATION NO. | : 10/376905 | |
| DATED | : March 6, 2007 | |
| INVENTOR(S) | : Bodo Benitsch | |

It is certified that error appears in the above-identified patent and that said Letters Patent is hereby corrected as shown below:

<u>Column 3,</u>

Line 25, "up to 10" should read -- of up to 10% --

<u>Column 7,</u>

Line 34, "be up to 10" should read -- be up to 10% --

Signed and Sealed this

Twenty-second Day of May, 2007

JON W. DUDAS
*Director of the United States Patent and Trademark Office*